G. H. SARGENT.
FLUID GAGE.
APPLICATION FILED JULY 8, 1912.
1,087,466.
Patented Feb. 17, 1914.
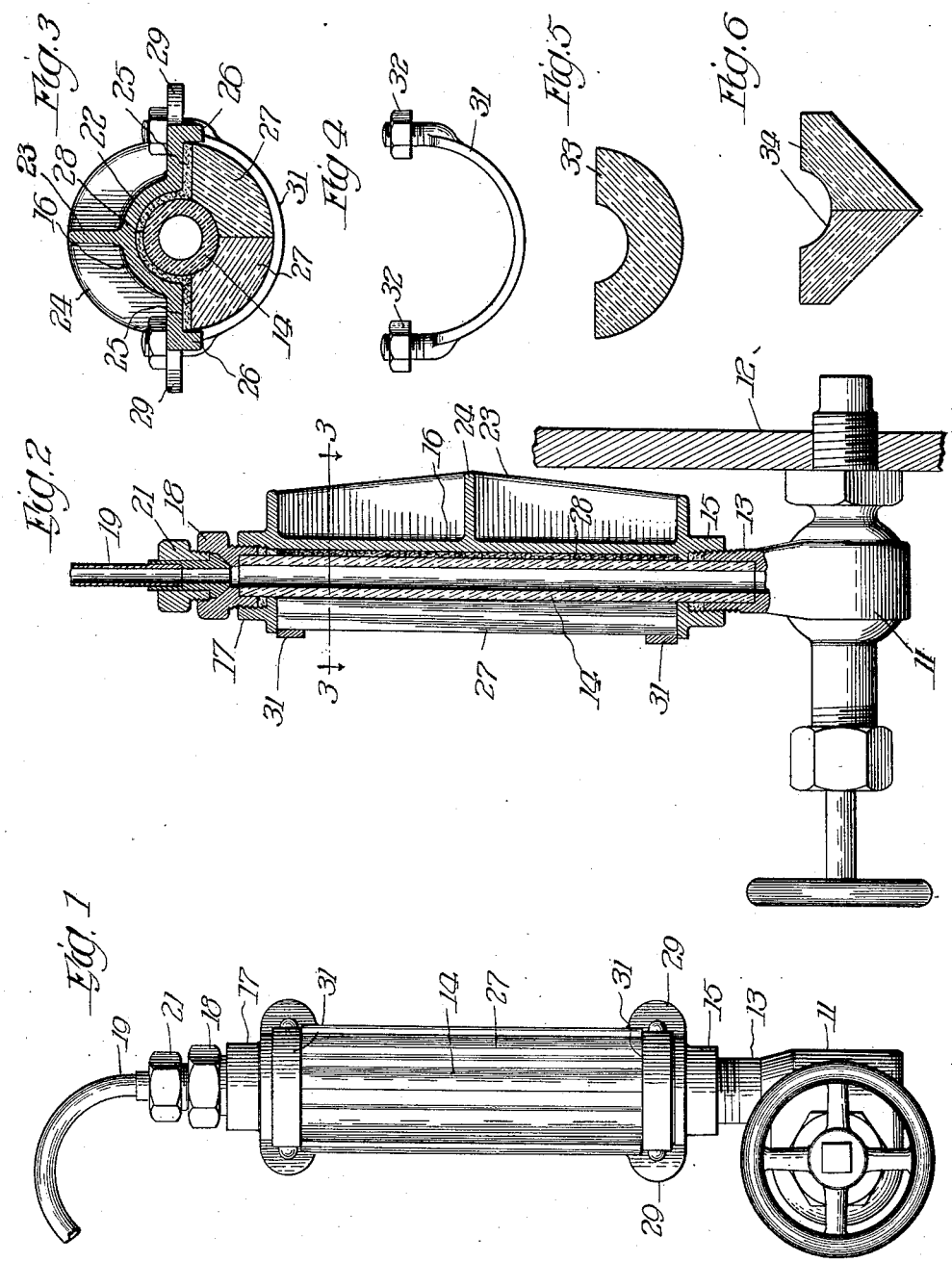
Witnesses:
Inventor:
George H. Sargent
by Luthirum Belt Fuller
Attys

UNITED STATES PATENT OFFICE.

GEORGE H. SARGENT, OF CHICAGO, ILLINOIS, ASSIGNOR TO SARGENT COMPANY, OF CHICAGO, ILLINOIS, A CORPORATION OF ILLINOIS.

FLUID-GAGE.

1,087,466.

Specification of Letters Patent.

Patented Feb. 17, 1914.

Application filed July 8, 1912. Serial No. 708,378.

*To all whom it may concern:*

Be it known that I, GEORGE H. SARGENT, a citizen of the United States, residing at Chicago, in the county of Cook and State of Illinois, have invented certain new and useful Improvements in Fluid-Gages, of which the following is a specification.

This invention pertains in general to fluid gages and aims to produce a device which, while particularly adapted for use as a water gage on locomotive boilers and the like, may also be adapted, with but slight modification and variation, for use as a lubricator gage or other similar device.

It is well known to those familiar with the art that locomotive steam gages are subjected to high internal pressures and to wear and erosion from the action of the steam and water contained therein. As the result of the wear and erosion of the gage glasses they frequently burst and explode under the high pressure of the steam and water contained therein and the particles of glass fly in all directions in the cab, sometimes inflicting severe injuries on the engineer and fireman. Furthermore, the occupants of the cab are sometimes burned or scalded by the hot steam and water which escapes when a gage glass breaks.

Prior to my present invention various types of gages have been designed, such as bull's-eye gages and Klinger gages which use a very thick glass set in a metallic frame, but even this thick glass will eventually weaken under the action of steam and hot water at high pressures and finally break, although the danger from flying particles of glass is less with these types of gages than with those simply employing a light tubular glass. One of the disadvantages of the bull's-eye and Klinger gages, however, resides in the fact that the water level in the glass can be seen only from points practically directly in front of the glass. Many railroads, therefore, prefer the old style tubular gage glass but, because of danger of injury to the cab occupants from flying particles of glass when the gage bursts, various forms of protectors have been devised to prevent the particles of glass from scattering throughout the cab. These protectors, while varying considerably in details of construction, have all, so far as I am aware, embodied a shield spaced from the gage glass proper and intended merely to protect the gage glass from external injury and to prevent the particles of glass from flying when the tubular glass explodes.

My present invention aims, not only to protect the tubular gage glass from external injuries and to prevent the particles of glass from scattering throughout the cab when the gage glass breaks but has for one of its principal objects the provision of a fluid gage in which the steam and water under pressure are contained in an ordinary tubular gage glass and the provision of means for surrounding and embracing this glass, thereby reinforcing it and preventing explosions of the glass. All of the wear and erosion of the steam and water is thereby exerted upon a cheap tubular glass which can be replaced at very little cost and the life of such a glass is very materially increased since it is reinforced upon all sides and, while the glass will eventually crack after it has been considerably worn, it can not explode as it would if the reinforcement were not provided.

Another object of the present invention is to provide a reinforcement for the tubular glass which will be transparent to permit observation of the gage glass, the transparent portion of the reinforcement being so shaped as to refract the rays of light from the gage glass thereby increasing the length of the arc within which the gage glass will be visible.

Other objects and advantages of the present invention will be apparent to those skilled in the art as the invention, in one of its preferred embodiments, becomes better understood by reference to the following description when considered in connection with the accompanying drawings throughout the various figures of which like reference characters refer to similar parts.

Referring to the drawings—Figure 1 is a front elevation of a gage embodying my invention; Fig. 2 is a longitudinal sectional view thereof taken on a median line; Fig. 3 is a transverse sectional view taken substantially on the line 3—3 of Fig. 2; Fig. 4 is a detail view of one of the clips; Fig. 5 is a transverse sectional view of a modified form of protector glass; and Fig. 6 is a similar view of still another form of glass.

On the drawings, 11 designates a gage cock of well known construction threaded into the end of a boiler 12 in the usual way. The body of the cock is provided with a hollow stud 13 adapted to receive the lower end of a tubular gage glass 14 and is externally threaded for connection with a threaded socket 15 provided at one end of a cast metal body or holder 16 forming the back of the gage. The opposite end of the body is likewise provided with a threaded socket 17 for engagement with a coupling 18 to which a flexible tube 19 connected at its free end with the top of the boiler is attached by means of a packing nut 21. The form of connection, however, may be varied as occasion requires and depending upon whether the gage is to be connected to a boiler, a lubricator, or some other device.

The body 16, which, as has been previously stated, is preferably formed of cast metal, is provided on its forward face with a centrally disposed longitudinally extending depression 22 curved transversely on an arc concentric with the tubular gage glass 14. The rear face of the body is preferably reinforced by longitudinally and transversely extending ribs 23 and 24, respectively, while the front face provides flat bearing surfaces 25 on each side of the depression 22 and terminating in forwardly projecting flanges 26. The front of the protector is made transparent so that the gage glass may be observed and, preferably, the front consists of a pair of plate glass members or sections 27 (Fig. 3) of concavo-convex formation, the concave face being adapted to conform to the curvature of the gage glass 14, so that the transparent front will embrace and reinforce the gage glass. In order to facilitate observation of the water level in the gage glass and, also, to insure a tight fit between the various sections of the protector portion, I prefer to interpose between the walls of the depression 22 in the back 16 and the gage glass a sheet of packing material 28. Although any preferred form of packing material may be employed, I have found that asbestos is particularly well adapted for the purpose by reason of the fact that it will not be affected or injured by the heat transmitted through the gage glass and, also, because it is of white color, thereby forming an admirable background for the gage glass which renders the water level readily discernible. The body 16 is provided adjacent its top and bottom and on each side with perforated ears or lugs 29 through which the threaded ends of clips 31 are inserted, the clips being drawn up to clamp the gage glass firmly between the transparent sections 27 and the packing 28 by means of nuts 32.

The transparent glass sections 27 not only permit observation of the right portion of the gage glass from any point in front of the flanges 26 but increase the angle of vision to a point behind these flanges by reason of the concavo-convex shape of the glass sections. This feature of construction so increases the angle of vision within which the gage glass may be observed that when the gage is secured upon a boiler end, the level of water within the gage may be seen from any point within the cab. Instead of making the glass front in two sections as shown in Fig. 3, it may be made in one piece as indicated at 33, Fig. 5, the inner and outer faces of which are concaved and convexed, respectively, in a similar manner. Other designs for the transparent front will readily suggest themselves to those familiar with the art, one additional form being disclosed in Fig. 6, in which the front consists of the sections 34 concaved on their inner faces, the outer faces being flat instead of curved and arranged at an angle, so that the light from the gage glass will be refracted and reflected to give the desired angle of vision.

It will be understood that the term "sight portion" of the gage-glass refers to the entire portion of the gage-glass between the packing nuts in which the water level can be observed.

From the foregoing it will be manifest that I have provided an improved fluid gage in which the water and steam are contained within an ordinary cheap tubular gage glass which can be readily replaced at small expense in case of breakage. The life of the gage glass, however, is materially increased by the reinforcing protector which embraces and surrounds the glass at all points throughout the length of the sight portion so that explosion of the glass is prevented. When the glass has been used for some time it will, of course, wear down to a thin shell and will, eventually, crack, but violent explosions of the glass are obviated and the pieces of the cracked glass are prevented from flying or scattering. The gage glass is also protected from cold drafts and from the spattering of cold water against it, with the result that its length of service is very materially increased.

While it is the aim of my invention to afford protection and reinforcement to the tubular gage glass, it will be understood that these advantageous results have been accomplished without obstructing the view of the glass and that, furthermore, the angle within which the glass may be observed has been materially increased by reason of the shape of the transparent front of the protector.

No claim is made in this application to the rigid back provided with tubular couplings at the ends and adapted to form an inflexible support for the gage glass, as this feature forms no part of the present invention.

I claim:

1. A fluid gage, comprising a gage glass, a sectional protector surrounding and embracing the sight portion of the glass, one or more of said protector sections being transparent to permit observation of the glass, and means for holding the protector sections in contact with said glass.

2. A fluid gage comprising a tubular glass, means for connecting the glass with a boiler, and means surrounding and embracing the glass in contact with the sight portion thereof for reinforcing the same, a portion of said surrounding means being transparent to permit observation of the glass.

3. The combination of a tubular glass, a holder therefor, a transparent covering for the front of the sight portion of the glass, and means for clamping said holder and covering together around the glass in contact with the sight portion thereof whereby said glass is strengthened and reinforced.

4. In a fluid gage, the combination of a tubular glass, a holder recessed longitudinally to receive said glass, a transparent member likewise recessed to receive the glass, the holder and transparent member surrounding and embracing the glass in contact with the sight portion thereof and means for clamping said holder and member together about the glass to maintain the holder and transparent member in contact with the glass.

5. A fluid gage comprising a tubular glass, a metallic back and a transparent front surrounding and embracing said glass in contact with the sight portion thereof, and means for clamping said back and front together about the glass to maintain the back and front in contact with the glass.

6. In a fluid gage, the combination of a tubular gage glass, and a holder therefor comprising a metallic back, a transparent front, a packing of relatively soft material interposed between the glass and the back, the packing and the front being in contact with the sight portion of the glass, and means for drawing the back and transparent front together about the glass to maintain the packing and the front in contact with the glass, whereby the glass is embraced and reinforced.

7. A fluid gage comprising an inner tubular gage glass surrounded and embraced by means in contact with the sight portion of the glass, adapted to prevent explosion of the tubular glass under the influence of internal pressure, said means being transparent at one side to permit observation of the tubular glass.

8. In a fluid gage, the combination of a metallic back provided with a longitudinally extending concave recess, a front of relatively thick glass connected to said back, said front being also provided on its inner face with a corresponding longitudinally extending concave recess, and a tubular gage glass positioned in the bore formed by the adjacent recesses of the front and back, the walls of said bore embracing the perimeter of said gage glass in contact with the sight portion thereof to strengthen and reinforce the gage glass.

9. A fluid gage comprising a metallic back, a glass front, a tubular glass disposed between said front and back, and means for drawing said front and back together to clamp the tubular glass therebetween, with the sight portion of the tubular glass in contact with the back and front members.

10. A fluid gage comprising a tubular gage glass adapted to be connected with a boiler, a protector including an opaque back and a transparent front surrounding and embracing the gage glass in contact with the sight portion thereof, said transparent front being shaped to increase the normal angle within which the glass may be observed.

GEORGE H. SARGENT.

Witnesses:
IRA J. WILSON,
M. A. KIDDIE.